United States Patent
Moss, III et al.

(10) Patent No.: US 12,181,044 B2
(45) Date of Patent: Dec. 31, 2024

(54) OPTIMIZING BELT AND WHEEL SYSTEMS

(71) Applicant: GATES CORPORATION, Denver, CO (US)

(72) Inventors: Thomas S. Moss, III, Englewood, CO (US); Leslee W. Brown, Englewood, CO (US); Jennifer E. Pease, Englewood, CO (US); Walt Lifsey, Englewood, CO (US); Kyle Spring, Englewood, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 17/960,062

(22) Filed: Oct. 4, 2022

(65) Prior Publication Data

US 2023/0358298 A1 Nov. 9, 2023

Related U.S. Application Data

(60) Provisional application No. 63/339,080, filed on May 6, 2022.

(51) Int. Cl.
*F16H 7/02* (2006.01)
*B65G 15/42* (2006.01)
(Continued)

(52) U.S. Cl.
CPC ............. *F16H 7/023* (2013.01); *F16G 1/28* (2013.01); *F16H 55/171* (2013.01); *B65G 15/42* (2013.01); *B65G 23/06* (2013.01)

(58) Field of Classification Search
CPC ... F16H 7/00; F16H 7/02; F16H 7/023; F16H 7/18; F16H 2007/185; F16H 55/17; F16H 55/171; F16H 2055/173; F16H 55/36; F16H 2055/363; F16H 55/49; F16G 1/00; F16G 1/28; F16G 5/00; F16G 5/20;
(Continued)

(56) References Cited

U.S. PATENT DOCUMENTS 2,934,967 A * 5/1960 Worrall, Jr. ............... F16G 1/28
74/462
2,937,538 A * 5/1960 Worrall, Jr. ............. F16H 7/023
74/462
(Continued)

FOREIGN PATENT DOCUMENTS

DE 3146975 A1 6/1983
DE 3724564 A1 * 2/1989 ............ F16H 7/023
EP 3650733 A1 5/2020

OTHER PUBLICATIONS

Search Report completed by the European Patent Office on Jan. 20, 2023 for International Patent Application PCT/US2022/045701.

*Primary Examiner* — Michael R Mansen
*Assistant Examiner* — Raveen J Dias
(74) *Attorney, Agent, or Firm* — Kevin J. Aiken, Esq.

(57) ABSTRACT

Belt systems, such as toothed systems, having a belt and a wheel (e.g., a pulley, gear, sprocket, etc.) that have the fit of the wheel optimized for the fit of the belt, and vice versa. The systems utilize combined techniques and materials to create a belt and wheel interface that improves and even maximizes performance by increasing the efficient transfer of power between belt and wheel, and by distributing the forces across multiple teeth of the wheel. A coating on the wheel can be used to modify the pitch of the wheel.

7 Claims, 6 Drawing Sheets

(51) Int. Cl.
*B65G 23/06* (2006.01)
*F16G 1/28* (2006.01)
*F16H 55/17* (2006.01)

(58) Field of Classification Search
CPC ........ B65G 15/00; B65G 15/30; B65G 15/42; B65G 23/00; B65G 23/02; B65G 23/04; B65G 23/06
See application file for complete search history.

(56) References Cited

U.S. PATENT DOCUMENTS

| | | | | |
|---|---|---|---|---|
| 3,146,975 A * | 9/1964 | Delamaire | ............. | B64D 17/34 60/39.47 |
| 3,313,166 A * | 4/1967 | Elster | ............. | F16H 7/023 474/205 |
| 3,756,091 A * | 9/1973 | Miller | ............. | F16G 1/28 74/462 |
| 3,968,701 A * | 7/1976 | Maruyama | ............. | F16H 7/023 156/138 |
| 3,977,265 A * | 8/1976 | Worley | ............. | F16G 1/28 474/205 |
| 3,990,160 A * | 11/1976 | Dellner | ............. | F16G 1/22 37/423 |
| 4,037,485 A * | 7/1977 | Hoback | ............. | F16G 1/28 474/148 |
| 4,041,789 A * | 8/1977 | Hoback | ............. | F16H 55/171 474/205 |
| 4,295,837 A * | 10/1981 | Marsh | ............. | F16H 7/023 474/205 |
| 4,427,403 A * | 1/1984 | Kanamori | ............. | F16G 1/28 474/205 |
| 4,452,594 A * | 6/1984 | Patterson | ............. | F16H 7/023 474/154 |
| 4,515,577 A * | 5/1985 | Cathey | ............. | F16G 1/28 474/204 |
| 4,553,952 A * | 11/1985 | Tangorra | ............. | F16G 1/28 474/205 |
| 4,586,915 A * | 5/1986 | Cathey | ............. | F16H 7/023 474/205 |
| 4,605,389 A * | 8/1986 | Westhoff | ............. | F16G 1/28 474/205 |
| 4,878,886 A * | 11/1989 | Kitabayashi | ............. | F16G 1/28 474/204 |
| 4,993,998 A * | 2/1991 | Tanaka | ............. | F16G 1/28 474/205 |
| 5,015,218 A * | 5/1991 | Macchiarulo | ............. | F16H 7/023 474/205 |
| 5,536,213 A * | 7/1996 | Macchiarulo | ............. | F16F 15/26 474/205 |
| 6,648,784 B2 * | 11/2003 | Redmond | ............. | F16H 7/18 474/204 |
| 8,070,634 B2 * | 12/2011 | Gaynor | ............. | F16H 55/171 474/205 |
| 8,932,165 B2 * | 1/2015 | Knox | ............. | F16G 1/28 474/204 |
| 11,098,797 B2 * | 8/2021 | Feuerborn | ............. | F16H 55/48 |
| 2003/0104889 A1 * | 6/2003 | Redmond | ............. | F16H 7/023 474/205 |
| 2006/0100051 A1 * | 5/2006 | Di Giacomo | ............. | F16G 5/20 474/134 |
| 2009/0275433 A1 * | 11/2009 | Gaynor | ............. | F16H 55/171 474/153 |
| 2015/0148161 A1 * | 5/2015 | Gajewski | ............. | F01L 1/02 474/141 |
| 2020/0141479 A1 * | 5/2020 | Feuerborn | ............. | F16H 55/42 |
| 2020/0182329 A1 * | 6/2020 | Ikeda | ............. | F16G 1/28 |
| 2020/0309242 A1 * | 10/2020 | Kurematsu | ............. | F16H 55/16 |
| 2023/0128744 A1 * | 4/2023 | Okabe | ............. | F16G 1/10 474/153 |
| 2024/0102533 A1 * | 3/2024 | Melz | ............. | F16G 1/28 |

* cited by examiner

OPTIMIZING BELT AND WHEEL SYSTEMS

CROSS-REFERENCE TO RELATED APPLICATION(S)

The present application claims the benefit of priority to U.S. Provisional Patent Application No. 63/339,080 entitled "OPTIMIZING BELT AND WHEEL SYSTEMS," filed on May 6, 2022, the entirety of which is hereby incorporated by reference.

BACKGROUND

Belts used in, for example, power transmission, require a certain amount of energy in order to turn the belt. The energy required to turn a belt depends on numerous different characteristics of the belt, including, but not limited to, the materials used in the belt, the mass of the belt, the thickness of the belt, the bending stiffness of the belt, surface properties of the belt, and the dimensions of the belt (e.g., as related to any teeth of the belt). The pulley, gear, or sprocket with which the belt engages also affects the energy required to turn the belt, including, but not limited to, the weight of the pulley, gear or sprocket, the quality of the bearing of the pulley, gear or sprocket, surface properties, and the dimensions (e.g., as related to any teeth).

Many power transmission systems do not achieve maximum performance capability due to losses associated with the belt-pulley (or gear, or sprocket) interface. This results in less than maximum performance, which could include less efficiency, more belt wear, less belt durability, more pulley (or gear, or sprocket) wear, or excessive noise, vibration and/or harshness (NVH) in the system.

When designing and manufacturing belts to engage with a pulley, gear or sprocket, a cost-benefit analysis needs to be considered. For example, a change in the materials used in the belt, such as the type, amount, and/or position of any load carrying cord, may beneficially lower the amount of energy needed to turn the belt, but may also consequently lower the durability of the belt or have some other negative impact on the performance of the belt. Additionally, the dimensions of the teeth in the belt, and how those teeth interact with the teeth on the pulley, gear or sprocket, can impact the performance of the belt.

SUMMARY

The present disclosure provides toothed belt systems, having a toothed belt and a toothed wheel (e.g., a pulley, gear, sprocket, etc.), that have the fit of the wheel to the belt optimized to take advantage of the interaction of the two surfaces. "Optimized" does not necessarily mean that the dimensional characteristics of the belt and wheel match.

Optimized fit is when the calculated performance of the system is within criteria that is supported by experimental and simulation data, e.g., stress analysis from finite element modeling. The specific criteria are the amount of tension required to wrap (fit) the belt to the wheel (also referred to as pitch equalizing tension (PET)), the maximum load transferred between a single belt tooth and groove of the wheel (referred to as maximum tooth load (MTL)), and lack of any loads that interfere with the efficient transfer of power between the belt and wheel (referred to as negative tooth loads). The criteria can be adjusted for certain optimization targets; for example, NVH adjustments may focus on a smaller range, or subset, of the durability range. Adjustments can be made to also improve NVH which uses a subset of the criteria, in some embodiments the NVH criteria being predetermined.

The criteria not only determine optimum fit but can determine how removed from optimum the system fit can be and still be acceptable. Specifically, pitch equalizing tension is kept between a minimum and maximum, which have been determined by experimental results and supported by finite element analysis (FEA), for example, by contour plots that identify optimal regions and non-optimal regions based on stresses and wear indices. The ideal maximum tooth load is based on a theoretical minimum load (with all the load distributed equally between the meshed teeth); the ratio of the maximum tooth load to the theoretical minimum load is considered with the knowledge that durability of the belt decreases with increase in maximum tooth load. In summary, non-optimal fit is any of the pitch equalizing tension being less than the minimum criteria, the pitch equalizing tension being above the maximum criteria, or the existence of negative tooth loads. Since tooth load considered independently of bending and other fatigue factors has an exponential impact on tooth load, optimization is considered when the maximum load is less than what a "matching" fit would yield.

In one particular implementation, this disclosure provides a belt system having a flexible, endless belt and a wheel, each of the belt and the wheel having a respective pitch at the belt pitch line, with the dimensions of the wheel optimized to the belt. In some implementations, the pitch of the wheel is within 5% of the pitch of the belt at the belt pitch line.

In another particular implementation, this disclosure provides a belt system having a flexible, endless, toothed belt having a belt pitch fit or belt fit, a toothed driver wheel having a driver wheel pitch at the belt pitch line dependent on an outer diameter of the driver wheel, and a toothed driven wheel having a driven wheel pitch at the belt pitch line dependent on an outer diameter of the driven wheel. The driver wheel pitch at the belt pitch line is optimized to the belt pitch. In some implementations, the pitch of the wheel is within 5% of the pitch of the belt at the belt pitch line.

In yet another particular implementation, this disclosure provides a method of optimizing a belt system having a belt and a toothed wheel. The method includes determining a fit of the belt, determining a desired fit of the wheel optimized for the belt, and modifying an outer diameter of the wheel to obtain the desired fit.

This disclosure also provides, in yet another particular implementation, another method of optimizing a belt system having a toothed belt and a toothed wheel. The method includes determining belt pitch properties as a function of tension, tooth deflection as a function of tension, and belt pitch line location, and determining a wheel outside diameter that achieves a predetermined pitch equalizing tension and that distributes the load between the meshed teeth more uniformly, and that inhibits, minimizes or eliminates any negative tooth loads. Once determined, the method includes modifying an outer diameter of the wheel.

These and other aspects of the toothed belt systems described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

DETAILED DESCRIPTION

As indicated above, the present disclosure is directed to optimizing the fit between a toothed belt and a toothed wheel (e.g., a pulley, gear, sprocket, etc.) of a system. The essence of optimizing the system is to achieve a more favorable loading of the belt by comparing the pitch of the belt under load with the pitch of the wheel at the cord position. Adjusting the difference between the two creates favorable loading.

The systems utilize combined techniques and materials to create a belt and wheel interface that improves and even maximizes performance by increasing the efficient transfer of power between belt and wheel, and by improving the distribution of forces across multiple teeth of the wheel. All combinations of toothed belts and wheels will distribute load across multiple teeth. By adjusting the wheel properties, including dimensions, materials, surface treatments and finishes, a more optimal distribution of loads can be achieved.

The fit is directly affected by the dimensions of the system; that is, the belt dimensions including the location of any load carrying cord, and the wheel dimensions. Using different system approaches, including adding coatings that affect the dimensions and other tribological characteristics of the interface between the belt and the wheel, creates systems that have improved and even maximized performance.

Thus, described herein are various embodiments that include dimensional changes and/or changed surface properties, which can be accomplished by various methods, including by the application of coatings.

Application of a coating, surface treatment, or surface finish on at least a portion of the wheel consequently distributes the load more uniformly between the wheel and the belt during use. For example, a coating on a pulley can create a more wear resistant surface, shift loading across more surface area to obtain a better pressure-velocity (PV) interface, and/or alter the location and/or the magnitude of load transfer between the belt and pulley. Such a coating can significantly reduce, and in some embodiments eliminate, negative loads that result from a poor belt-pulley interface. These negative loads resist the transfer of power or act to increase load transfer in other areas of the interface, resulting in a loss of efficiency.

By optimizing the fit between the belt and the wheel, the efficiency of the interface and the system is optimized, resulting in longer lasting systems, smoother meshing of the teeth, improved (e.g., reduced) noise, and/or reduced vibration.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of an upper-case letter to denote one of multiple similar components. When reference is made to a reference numeral without specification of a sub-label, the reference is intended to refer to all such multiple similar components.

Figure 1:
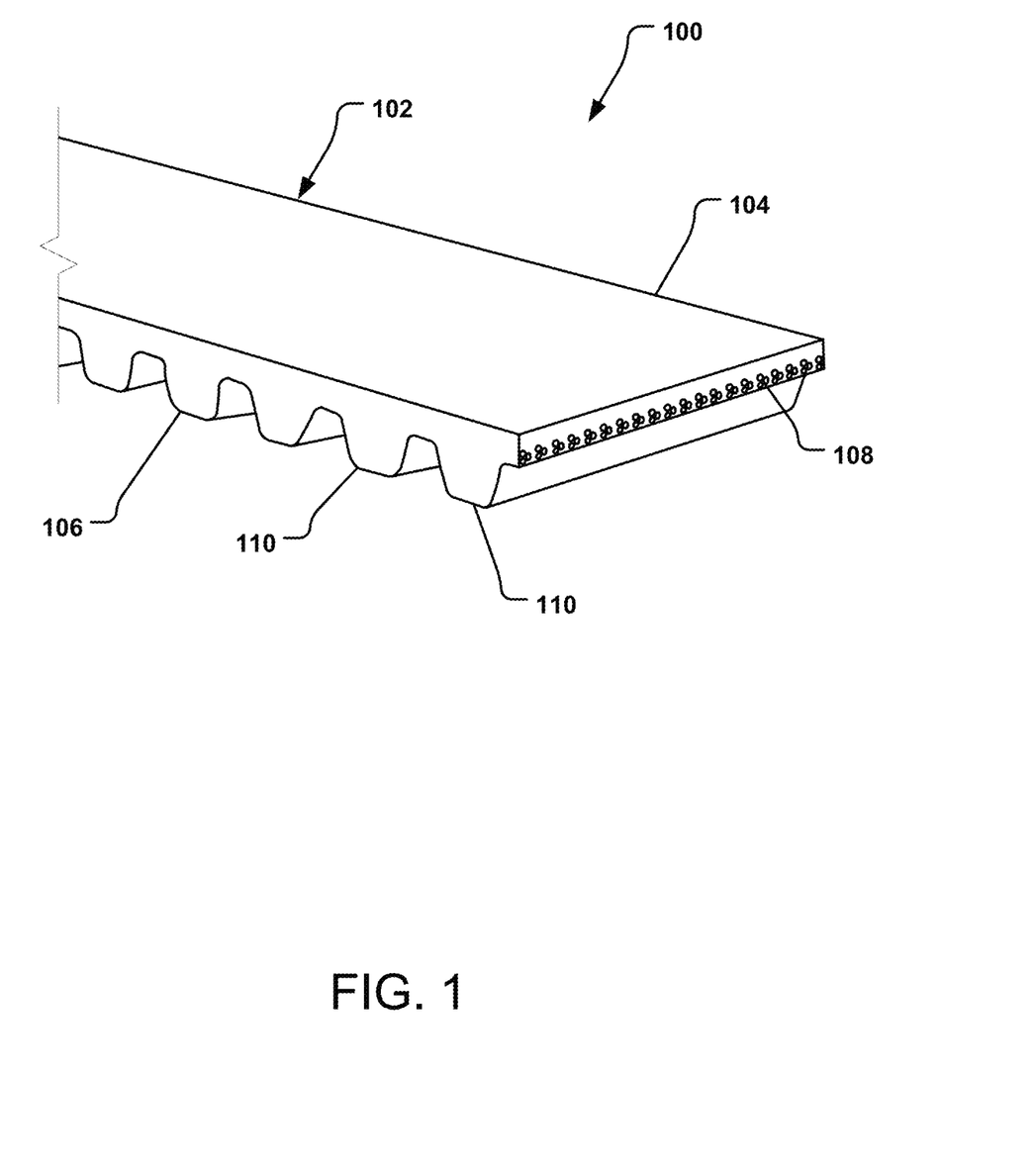
FIG. 1 is a perspective, cross-sectional view of a portion of a belt.

Turning to the figures, FIG. 1 shows a generic belt 100 having a body 102 formed of a flexible material having a back side 104 and a front side 106 with a plurality of load carrying cords 108 within the body 102, the particular cords 108 in FIG. 1 bound in triplicate bundles although in other embodiments the cords 108 may be single cords or bundled otherwise. The cords 108 may be, e.g., carbon cords, polymeric cords (e.g., polyester, aramid), fiberglass cords, etc. Defined in the front side 106 are a plurality of teeth 110; trapezoidal teeth are depicted in this embodiment of FIG. 1 but the tooth shape is not limited thereto and can take any shape that is compatible with a sprocket, gear or other toothed wheel. Each individual tooth 110 extends either perpendicular to or angled/helical to the longitudinal length of the belt 100 so that the plurality of teeth 110 run along or around the length of the belt 100. In use, the teeth 110 on the front side 106 are in contact with a drive mechanism, e.g., a toothed gear or sprocket. Although not seen in FIG. 1, the belt 100 is an endless belt, having the form of a loop with no beginning and no end. The belt 100 may have a splice therein.

Figure 2A:
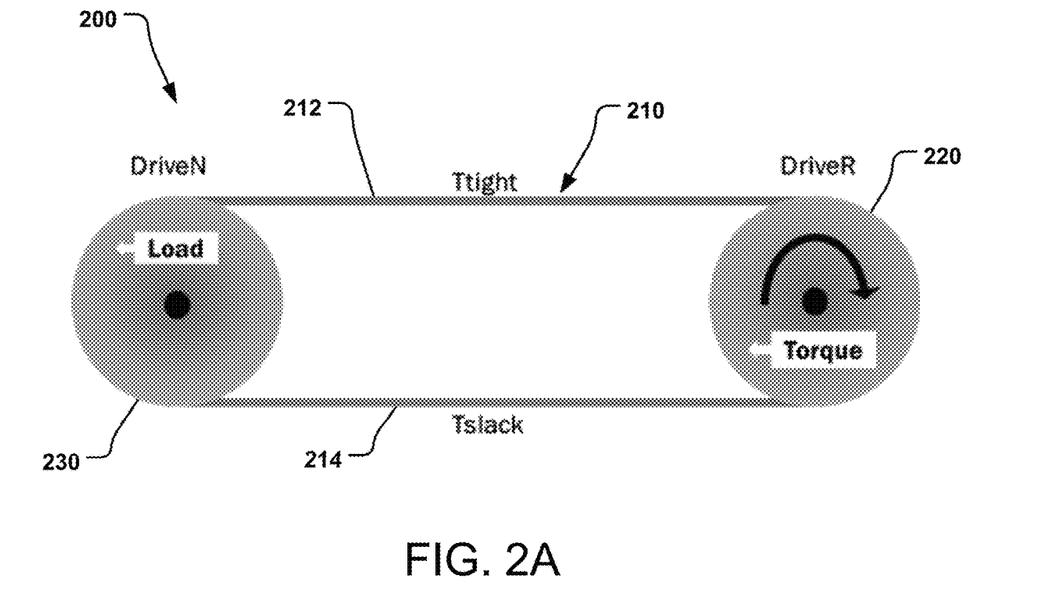
FIG. 2A is a schematic side view of a belt system having two wheels such as pulleys, gears or sprockets.

FIG. 2A shows a system 200 having a belt 210 mounted on a first, driver wheel 220 and a second, driven wheel 230, with the direction of rotation indicated on the driver wheel 220. The wheels 220, 230 may be, pulleys, idlers, gears, sprockets, etc. In some embodiments, at least the driver wheel 220 is a toothed wheel.

Power, in the form of torque, at a rotational speed, is applied to the driver wheel 220 and transferred to the driven wheel 230 via the belt 210. Indicated in FIG. 2A is the direction of torque and load on the belt 210 based on the rotation direction.

Based on the rotation direction, the belt 210 has a tight side 212 and a slack side 214, indicated as Ttight and Tslack, respectively. The difference in belt tension (Ttight−Tslack), also referred to as the effective tension, represents the pull force applied by the driver wheel 220 to the driven wheel 230. The ratio of the tension in the tight side 212 to the slack side 214, referred to as the tension ratio (TR), is often used to describe the system 200.

Initially when installed, the belt 210 is tensioned (Tinitial) and the tension on the tight side 212 and the slack side 214 are approximately equal (Ttight=Tslack). During operation, the tight side 212 tension (Ttight) will increase and the slack side 214 tension (Tslack) will decrease. The slack side tension will be limited to approximately zero, as the slack side span is unable to support a significant compression load.

Figure 2B:
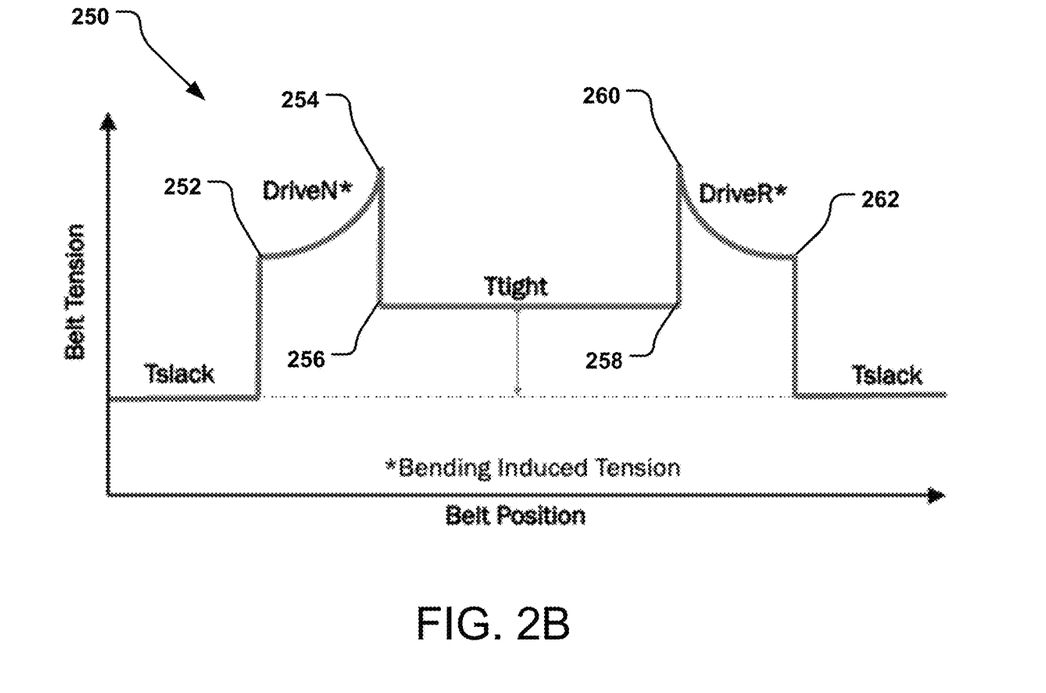
FIG. 2B is a graphical representation of belt tension as a function of belt position.

FIG. 2B shows a graph 250 of the belt tension as a function of belt position, based on the system 200. As seen in the graph 250, progressing left to right which represents the belt position in relation to the driven wheel 230 and the driver wheel 220, the slack side 214 has Tslack, which is a low value, which then increases to point 252 when the belt engages the driven wheel 230. As the belt 210 progress around the driven wheel 230 (in a clockwise direction) the tension non-linearly increases to point 254; generally, the tension increase is non-linear although the ideal state is linear. The tension decreases to point 256 when the belt 210 no longer is engaged with the driven wheel 230; this tension value at the point 256, extends between the point 256 and the point 258 and is the Ttight on the tight side 212 of the belt 210. The belt tension increases to point 260 when the belt 210 engages with the driver wheel 220. The tension decreases as the belt 210 progress around the wheel 220 to point 262; generally, the tension decrease is non-linear although the ideal state is linear. When the belt 210 releases from the driver wheel 220, the tension returns to Tslack.

Figure 3:
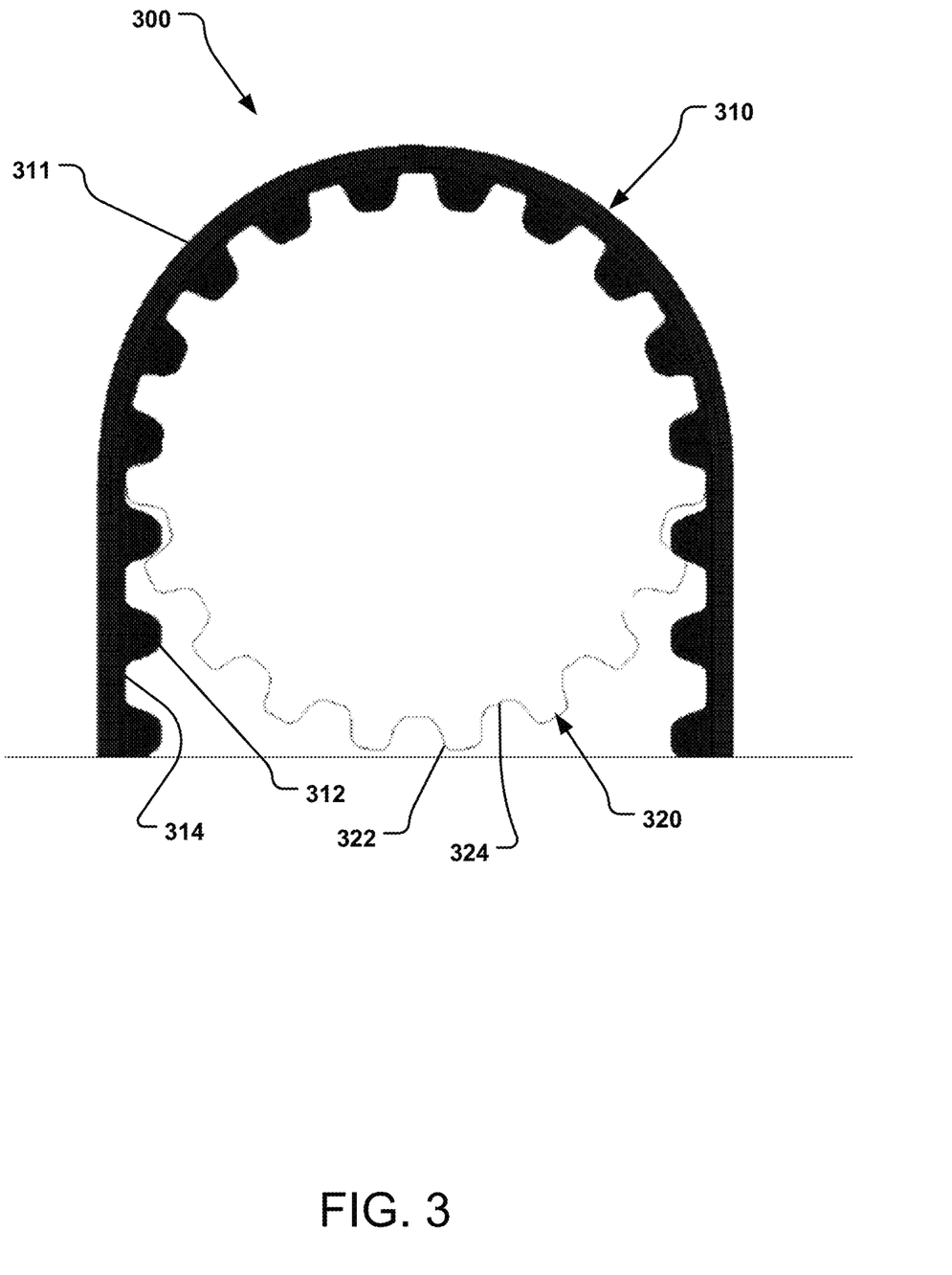
FIG. 3 is an enlarged schematic side view of a toothed belt engaged with a toothed wheel such as a pulley, gear or sprocket.

The tension graph 250 generally applies to toothed belts when engaged with toothed wheels such as pulleys, gears or sprockets. FIG. 3 shows a portion of a system 300 having a toothed belt 310 engaged with a toothed wheel 320. The belt 310 has a body formed of a flexible material having a back side 311 and an opposite front side having defined therein a plurality of teeth 312. The shape of the teeth 312 is not limited thereto and can take any shape that is compatible with the wheel 320. Each individual tooth 312 extends perpendicular or angled to the longitudinal length of the belt 310, so that the plurality of teeth 312 run along or around the length of the belt 310. A land 314 is present between adjacent teeth 312. Although not seen in FIG. 3, the belt 310 is an endless belt, having the form of a loop with no beginning and no end.

The wheel 320 has a plurality of teeth 322 around the circumferential surface, with a land 324 present between adjacent teeth 322.

In use, the teeth 312 of the belt 310 are in contact with a drive mechanism, e.g., a toothed gear or sprocket, e.g., wheel 320, by engaging with the lands 324 of the wheel 320, and the teeth 322 of the wheel 320 engaging with the lands 314 of the belt 310. In such a manner, the teeth 312, 322 and the lands 314, 324 mesh.

Returning to the graph 250 of FIG. 2B, it is seen, for example from point 252 to point 254 for the driven wheel, that the tension on a point of the belt (e.g., a particular tooth) increases non-linearly as the belt progresses around the wheel. Conversely, for the driver wheel, from point 260 to point 262, the tension on a point of the belt (e.g., a particular tooth) decreases non-linearly as the belt progresses around the wheel.

What is desired is to have a more constant tension on a point of the belt as the belt progresses around the wheel (e.g., the driven wheel or the driver wheel). Also desired is to have a linear increase or decrease in tension as a function of belt position (e.g., per FIG. 2B); a linear increase or decrease is the result of an equal distribution of load between all the meshed teeth. By optimizing the fit between the belt and the wheel, the tension on the belt, as it progresses around the wheel, is more constant, the peak tooth load (force) is reduced, and the effective tension load is distributed over more teeth. With an optimized fit, the force between the belt and the wheel is almost equally distributed across the teeth engaging with the belt. The result is a longer life belt and a more efficiently operating system.

For systems having more than one wheel with which the belt engages, the fit is optimized for each wheel, in relation to the belt. In some multi-wheeled systems, for the particular wheel where the tooth loads and pitch equalizing tension is more severe, there may be more focus on optimizing that particular wheel.

Figure 4:
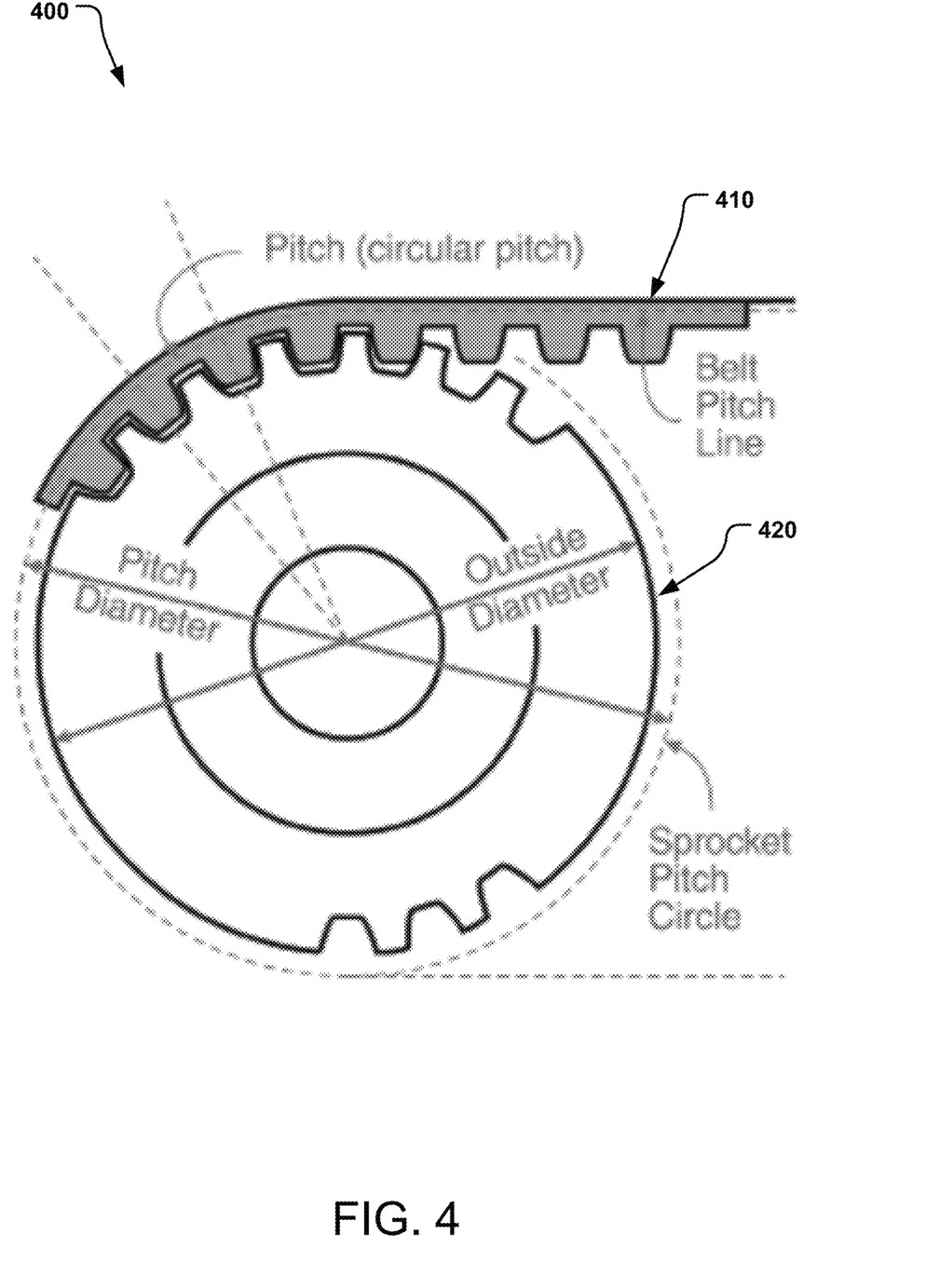
FIG. 4 is a schematic side view of engagement of a toothed belt with a toothed wheel such as a pulley, gear or sprocket, showing various measurements.
Figure 5:
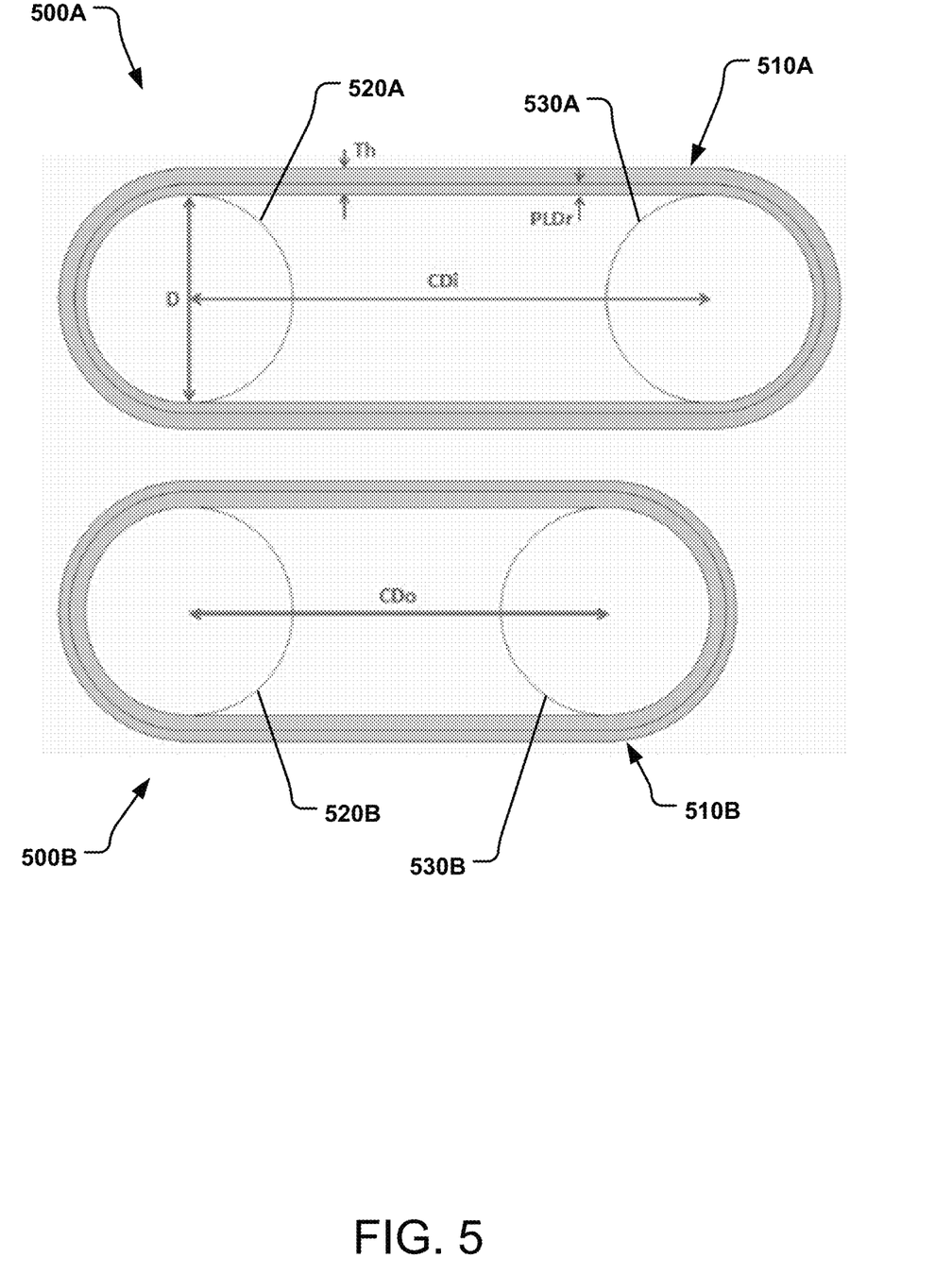
FIG. 5 is a schematic side view of two systems of a belt with a wheel such as a pulley, gear or sprocket, showing various measurements.

As used herein, the pitch line diametrical difference (PLDD), rather than the radial pitch line difference (rPLD, PLD, PLDr), is used to define a belt's pitch line as influenced by the load carrying cord location. By using the PLDD, the dimensional adjustment calculation is more precise than if the rPLD, the PLD, or PLDr is used. For example, less calculation mistakes occur when comparing the belt PLDD to the wheel dimensions than, for example, when comparing the belt radial pitch line difference to the wheel outside diameter. FIGS. 4 and 5 show two belt systems and the discussion related thereto provides guidance regarding calculating fit.

Turning to FIG. 4, a portion of a system 400 having a toothed belt 410 and a toothed wheel 420 is shown. It is noted that not all the teeth in the wheel 420 are shown, as typically the teeth extend around the entire circumference of the wheel 420, nor is the belt 410 shown extending fully around the wheel 420; rather, the details shown in FIG. 4 are sufficient to provide an understanding of the terminology and measurements used for determining fit. Belt fit relies on three belt properties, the belt pitch line diametrical difference (belt PLDD), the pitch stiffness (Kpitch), and zero tension pitch (ZTP).

FIG. 4 shows, for the belt 410, the Belt Pitch Line, which is the line where the linear speed of the belt 410 matches the tangential speed of the wheel 420, which is based on gear design. It is assumed that the Belt Pitch Line is coincident with the center of the load carrying cord within the belt. The pitch line can be defined by measurements, including the location of the load carrying cord(s). It is noted that because the Belt Pitch Line is determined by the position of the load carrying cord and is inherent to the belt, two belts with different cord locations placed on the same wheel of a particular outside diameter will have two separate (different) pitch diameters.

The distance from the belt land (e.g., land 314 of FIG. 3) to the Belt Pitch Line (which is also the minimum thickness of the belt) is called the belt Pitch Line Difference (PLD), which is measured by measuring the length of a rotating belt upright and inverted in measuring pulleys. The PLD is also a function of the location of the load carrying cord(s).

An imaginary circle, referred to as the Pitch Diameter for a particular combination of wheel and belt, can be defined by the wheel outside diameter increased by the belt pitch line diametrical difference (PLDD). That is, Pitch Diameter=Wheel Outside Diameter+Belt PLDD. This imaginary circle represents the location of the Belt Pitch Line as it travels around the wheel at the tension used to measure the Belt Pitch Line (the measuring tension); at the measuring tension, Ttight equals Tslack (that is, there is no load transfer).

The wheel or pulley pitch line difference (PLD) is the difference in the wheel's outside diameter (OD) and the imaginary pitch diameter based on the nominal pitch of the system. For convenience, both the belt pitch and the wheel pitch are described using the pitch line diametrical difference (PLDD), which is double the radial PLD. The wheel or pulley pitch is defined as the circumference of the Sprocket Pitch Circle, divided by the number of grooves in the sprocket. The Sprocket Pitch Circle is the circle defined by the Pitch Diameter. For wheels or pulleys that are not perfect circles, the wheel or pulley pitch would be defined using a pulley circumference based on an offset of the pulley profile equal to half the PLDD divided by the number of pulley grooves.

Changing the fit of the belt 410 on the wheel 420 can change the relationship or interaction between the belt 410 and the wheel 420 during use. By optimizing the fit between the belt 410 and the wheel 420, which includes surface properties, the tension on the belt 410, as it progresses around the wheel 420, is more constant, the peak tooth load (force) is reduced, and the effective tension load is distributed over more teeth. Additionally, by optimizing the fit, the load transfer between the belt and the wheel is distributed more uniformly, resulting in a more optimum tooth loading, e.g., shown as a less-non-linear curvature in FIG. 2B.

FIG. 5 shows a system in two different configurations, as systems 500A, 500B, each having a belt 510A, 510B and two wheels 520A, 520B and 530A, 530B, respectively; the belt 510A, 510B and the wheels 520A, 520B and 530A, 530B are the same in each of the systems 500A, 500B. In the system 500A, the belt 510A is placed in normal operating position with the teeth engaged in the grooves of the wheels 520A, 530A. In the system 500B, the same belt 510B is inverted with its back side contacting the wheels 520B, 530B. It is noted that the teeth in the belts 510A, 510B and the wheels 520A, 520B and 530A, 530B are not shown; rather, the details shown in FIG. 5 are sufficient to provide an understanding of the terminology and measurements used for determining fit.

As indicated above, fit relies on three belt properties, the belt pitch line diametrical difference (belt PLDD), the pitch stiffness (Kpitch), and zero tension pitch (ZTP). These properties are determined from belt length measurements, including the belt length at measuring tension, the inverted belt length at measuring tension, the web thickness, and the belt length at a tension higher than the measuring tension (e.g., 2× measuring tension).

Referring to FIG. 5, shown is the radial pitch line differential (PLDr), the web thickness (Th), the inside center distance (i.e., the distance between the center points of wheels 520A, 530A when the belt is positioned on the wheels with the teeth of the belt engaged in the teeth of the wheels) ($CD_{inside}$ or CDi), the outside center distance (i.e., the distance between the center points of wheels 520B, 530B when the belt is inverted and positioned on the wheels with the back of the belt against the wheels) ($CD_{outside}$ or CDo), and the wheel diameter (D).

To determine the belt's diametrical pitch line differential (PLDD), it is assumed that the pitch line is coincident with the belt's bending neutral axis, the pitch line length of the belt (Lp) is constant in both measurements, and that compression of the thickness is minimal. With these assumptions, then the pitch length for the inside center distance (Lpi) and the outside center distance (Lpo) are provided by Equation (1) and Equation (2), respectively.

$$Lpi=2 \cdot CDi+\pi(D+2PLDr) \quad (1)$$

$$Lpo=2CDo+\pi(D+2Th-2 \cdot PLDr) \quad (2)$$

Because the lengths Lpi and Lpo are equivalent, this reduces to Equation (3).

$$PLDr=(CDo-CDi)/2\pi+Th/2 \quad (3)$$

Two times PLDr is equivalent to the belt pitch line diametrical difference, or PLDD. Thus, Equation (4) defines the belt's PLDD.

$$BeltPLDD = \left(\frac{CD_{outside} - CD_{inside}}{\pi}\right) + WebThickness \quad (4)$$

It is noted that the belt PLDD and the cord position are approximately the same.

To determine the pitch stiffness of the belt, the belt is measured at two different tensions, F1 and F2, so that CD1 is the distance between wheel centers at F1 and CD2 is the distance between wheel centers at F2. The belt pitch stiffness, Kpitch, is provided in Equation (5).

$$Kpitch=(F2/2-F1/2)/(CD1-CD2) \cdot (BeltTeeth/2) \quad (5)$$

To determine the pitch at zero tension (ZTP), using the two belt measurements Lpi and Lpo, the ZTP is calculated assuming a linear relationship between pitch (BeltPitch) and tension (BeltTension), as provided in Equation (6).

$$ZTP=BeltPitch-(BeltTension/Kpitch) \quad (6)$$

However, a belt's pitch varies with tension. Thus, depending on the tension on the belt during use, the belt may not be optimized for a particular wheel pitch. Thus, the teachings of optimizing fit described herein are intended for operating systems, with the belt under operating tension, using the pitch of the belt at operating conditions, which is a function of the tension.

To optimize the fit of the system, the wheel's outside diameter and/or surface properties can be modified to create a more beneficial difference, "delta," between the belt pitch at a particular tension and the corresponding pitch of the wheel calculated at the belt's pitch line. To determine the pitch of the wheel at the belt's pitch line, the wheel outside diameter (OD) is measured and the number of grooves (or number of teeth) is counted. Equation (7) defines the wheel's pitch at the belt.

$$\text{Wheel Pitch @ Belt Pitch Line} = \frac{(OD + BeltPLDD)\pi}{NGrooves} \quad (7)$$

As indicated above, it is not necessary that the belt PLDD (or pitch), when under tension, is matched to the wheel PLDD (or pitch), but rather, the two pitches are optimized for each other. It is the difference between the belt pitch at any given tension and the pitch of the wheel at the belt pitch line that affects the optimization of the fit and is used as the definition of "fit," or equivalently "pitch fit," at that given tension. When combined with the belt properties and the interface properties, this difference (delta) determines the pitch equalizing tension and the distribution of the loads.

The fit is optimized when the effect of the difference in belt pitch and pulley pitch reduces the maximum tooth loads and minimizes or eliminates negative tooth loads. The reference state would be typically the matching state but frequently is what occurs when a typical non adjusted sprocket of nominal pitch diameter is paired with a belt.

Fit, or delta, can also be expressed as a percentage of the pitch. In some embodiments, the difference in pitch between the belt and the wheel at the belt pitch line may be no more than, e.g., 1%, 2%, 5%, or 10%, of the nominal pitch.

As a general example, by increasing the OD of a wheel 200 micrometers, the fit of the wheel is optimized in relation to the fit of the belt, and the life expectancy of the belt is thus 10× that of the same belt on the initial wheel (being 200 micrometers less in diameter).

Tables 1 through 4 provide specific examples of optimized system fit for three example systems, where Table 1 provides the belt properties, Table 2 provides the wheel properties, Table 3 provides the comparative fit of the belt and the wheel of the system, and Table 4 provides the test results. As indicated above, belt fit relies on three belt properties, the belt pitch line diametrical difference (belt PLDD), the pitch stiffness (Kpitch), and zero tension pitch (ZTP).

In Table 1, the Belt Pitch Function and Tooth Deflection Function are linear functions (see Equation (6)), but they can be any function that represents the relationship, i.e., the dependence on tension, including, e.g., a table of values.

The following Equations (8) and (9) were used to determine the values in Table 1.

$$\text{Belt Pitch Function (Tension)} = (\text{Tension}/K\text{pitch}) + \text{ZTP} \quad (8)$$

$$\text{Tooth Deflection Function (Toothload)} = \text{Toothload}/K\text{tooth} \quad (9)$$

TABLE 1

| Example | nominal system pitch (mm) | Belt PLDD (mm) | Belt Pitch Function ZTP (mm) | Belt Pitch Function Kpitch (kN/mm) | Tooth Deflection Function— Ktooth (kN/mm) | Surface properties |
|---|---|---|---|---|---|---|
| 1 | 9.525 | 1.87 | 9.522 | 16 | 0.80 | Belt coating |
| 2 | 9.525 | 1.95 | 9.512 | 20.2 | 0.795 | Belt coating |
| 3 | 8 | 1.524 | NA | NA | NA | Nylon/rubber |

TABLE 2

| Example | Standard outside diameter (mm) | Outside diameter (mm) | Adjustment (mm) |
|---|---|---|---|
| 1 | 59.288 | 58.82 | −0.468 |
| 2 | 56.156 | 55.776 | −0.38 |
| 3 | 69.701 | 69.93 | 0.229 |

TABLE 3

| Example | Delta (microns) | PET (N/mm) | Load ratio | Negative load |
|---|---|---|---|---|
| 1 | 11 | 18 | 1.9 | No |
| 2 | 33 | 67 | 1.7 | No |
| 3 | 8 | NA | NA | NA |

TABLE 4

| Example | STD life | ADJ life | Improvement |
|---|---|---|---|
| 1 | 80 | 849 | 10.6x |
| 2 | 779 | 1120 | 1.4x |
| 3 | 21 | 206 | 9.8x |

As shown above, the fit is dependent on the dimensions of the item, i.e., the belt and/or the wheel. To adjust the fit, the dimensions of the item can be adjusted. In many systems, it is more feasible to easily adjust the dimensions of the wheel than of the belt.

For a wheel (e.g., pulley, sprocket, gear, idler, etc.), the dimensions can be modified during the forming process of the wheel. For example, during the process of making the wheel, e.g., by casting, molding, machining, water jet cutting, plasma cutting, etc., the wheel dimensions can be modified. Additionally or alternately, the dimensions can be modified after formation of the wheel.

For example, the OD of the wheel can be increased after forming the wheel by applying a coating onto at least a portion of the outer periphery or circumference of the wheel. Example coating techniques include deposition (e.g., PVD, CVD, sputtering, any of these with or without plasma aid), plating (e.g., electrolysis, electroless), oxidation techniques, plasma spray. Example coating materials include diamond-like-carbon (DLC), tungsten carbide, silicon carbide, chromium carbide, boron nitride, titanium nitride, and chromium nitride.

The coating is applied at a thickness to create the desired dimensional increase, e.g., an increase of at least 5 micrometers, 10 micrometers, 25 micrometers, 50 micrometers, 100 micrometers, etc. As an example, a 100 micrometer thick coating around the circumference or periphery of the wheel will provide a 200 micrometer increase in OD.

The coating can be selected to affect the interaction of the belt with the wheel and/or to affect the wear and/or life of the wheel. For example, a coating (e.g., DLC) can be selected to affect the coefficient of friction between the wheel and the belt. A coating (e.g., nitride or carbide) can be selected to extend the life of the wheel, by providing protection to the wheel from environmental factors (e.g., dust, acidic environments, caustic or alkaline environments) or by modifying physical features (e.g., increase durability and wear features of the wheel).

The OD of the wheel can be decreased after forming the wheel by removing a portion of the wheel at the outer circumference or periphery. Example material removal techniques include, but are not limited to, bead blasting, tumbling, oxidizing, milling, and chemical-mechanical polishing (CMP). In addition to changing the dimensions, modifying the surface of the wheel can affect, e.g., the coefficient of friction between the wheel and the belt.

Figure 6:
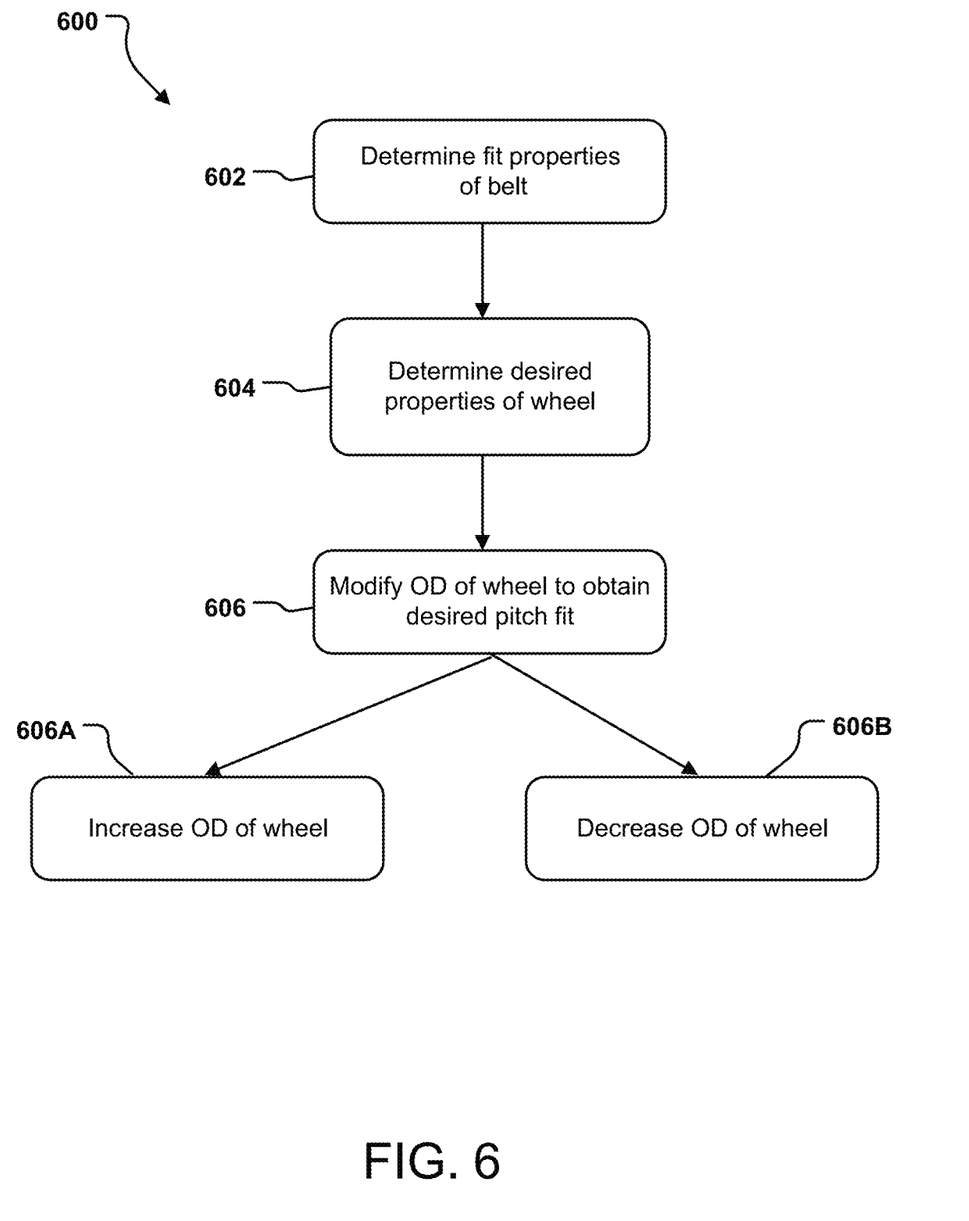
FIG. 6 is a flowchart showing a stepwise method.

FIG. 6 shows a general method 600 for optimizing the pitch fit or fit of a system having a belt and a toothed wheel.

In a first step 602, the properties of a belt are determined; examples of belt properties include belt pitch as a function of tension (pitch stiffness), tooth deflection as a function of tooth load (tooth stiffness), and inherent surface properties, such as surface friction or coefficient of friction, and hardness. To the extent that the inherent surface properties affect the stiffness or compliance of the belt, they are included in the measurements. Because the surface properties are measured on "measuring pulleys" with similar surface properties as the application pulleys, the effect or optimization of those surface properties is included in the characterization of the belt properties. For example, if a coating is used to achieve a certain dimension, coefficient of friction, hardness, or wear resistance, then the measuring pulleys should have similar coating and the effect of the changes is reflected in the fit properties.

In a step 604, sequentially or at least partially simultaneously with step 602, the desired dimensions and surface properties of a wheel are determined, optimizing the performance of the system; examples of wheel properties include the outside diameter of the wheel and the coefficient of friction and hardness of the wheel. The optimized fit will be influenced by the properties of the belt and their interaction with the properties of the wheel.

In step 606, the dimension (outer diameter, OD) of the wheel is modified to obtain the desired fit. The modification may be by increasing the diameter (step 606A) or by decreasing the diameter (step 606B). Increasing the diameter of a wheel can be done by applying a coating to a desired thickness to the wheel.

In addition to using a coating on a wheel to modify the PLDD and the fit of the wheel, a coating can provide aesthetic qualities (e.g., a particular color of wheel). A coating can also be used as a visual indicator, such as of wheel wear. For example, the coating may have a particular color, and that color wears (e.g., due to the coating eroding) as the wheel approaches it life's end.

A treatment to modify the surface properties or other features of the wheel may be done to the wheel. For example, the wheel may be cryogenically hardened.

A coating with a particular wear rate can be applied to the wheel, whether or not the coating is used to modify the dimensions of the wheel, thus controlling the wear and overall life of the wheel. In some embodiments, the belt and/or the wheel can be designed to have a similar life, so that both the belt and the wheel are replaced at the same time.

Thus, described herein are various embodiments that include dimensional changes and/or changed surface properties to belt systems, which can be accomplished by various methods, including by the application of coatings. Various features and details have been provided in the multiple designs described above. It is to be understood that any features or details of one design may be utilized for any other design, unless contrary to the construction or configuration. Any variations may be made.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A belt system comprising:
   a flexible, endless, toothed belt having a belt pitch, a belt pitch line and a belt pitch line diametrical difference (belt PLDD);
   a toothed driver wheel having a driver wheel pitch at the belt pitch line dependent on an outer diameter of the toothed driver wheel; and
   a toothed driven wheel having a driven wheel pitch at the belt pitch line dependent on an outer diameter of the toothed driven wheel;
   wherein the driver wheel pitch is within 5% of, but not equal to, the belt pitch at the belt pitch line; and
   wherein the driven wheel pitch is within 5% of the belt pitch at the belt pitch line and is not equal to the driver wheel pitch.

2. The belt system of claim 1, wherein, upon meshing teeth of the toothed belt with teeth of the toothed driver wheel and teeth of the toothed driven wheel, a load between the toothed belt and the toothed driver wheel is equally distributed across the teeth of the toothed belt that are meshed with the teeth of the toothed driver wheel, and a load between the toothed belt and the toothed driven wheel is equally distributed across the teeth of the toothed belt that are meshed with the teeth of the toothed driven wheel.

3. A method of optimizing a belt system having a toothed belt and a toothed wheel, the method comprising:
   determining a pitch of the toothed belt;
   determining a desired pitch of the toothed wheel, the difference between the pitch of the toothed belt and the desired pitch of the toothed wheel defining a desired fit between the toothed belt and the toothed wheel; and
   modifying an outer diameter of the toothed wheel to obtain the desired fit between the toothed belt and the toothed wheel;
   wherein modifying the outer diameter of the toothed wheel comprises increasing the outer diameter of the toothed wheel by applying a coating to the toothed wheel having a thickness of at least 10 micrometers.

4. The method of claim 3, wherein modifying the outer diameter of the toothed wheel comprises modifying surface properties of the toothed wheel at the outer diameter.

5. The method of claim 3, wherein determining the desired fit of the toothed belt comprises determining a belt pitch line location.

6. A method of optimizing a belt system having a toothed belt and a toothed wheel, the method comprising:
   determining a pitch of the toothed belt;
   determining a desired pitch of the toothed wheel, the difference between the pitch of the toothed belt and the desired pitch of the toothed wheel defining a desired fit between the toothed belt and the toothed wheel; and
   modifying an outer diameter of the toothed wheel to obtain the desired fit between the toothed belt and the toothed wheel;
   wherein the determining the desired pitch of the toothed wheel comprises: using computational or experimental means to determine the pitch of the toothed wheel that minimizes maximum tooth loads on any tooth of the toothed belt in mesh on the toothed wheel and minimizes or eliminates negative tooth loads on any tooth of the toothed belt in mesh on the toothed wheel.

7. The method of claim 6 wherein the belt system comprises one or more additional toothed wheels, and the method of claim 6 is applied to one or more of said additional toothed wheels.

* * * * *